United States Patent [19]
Pendleton

[11] Patent Number: 5,107,617
[45] Date of Patent: Apr. 28, 1992

[54] CHUM BUOY

[76] Inventor: Michael K. Pendleton, 336 Howle Ave., Charleston, S.C. 29412

[21] Appl. No.: 559,909

[22] Filed: Jul. 30, 1990

[51] Int. Cl.⁵ .................................................. A01K 97/02
[52] U.S. Cl. .................................................. 43/44.99
[58] Field of Search ............... 43/44.99, 41, 55, 56; 220/560, 601, 420, 425, 506; 222/54, 160, 162

[56] References Cited

U.S. PATENT DOCUMENTS

| | | | |
|---|---|---|---|
| 2,111,959 | 3/1938 | Baxter | 43/55 |
| 2,713,744 | 7/1955 | Strausser | 43/44.99 |
| 2,842,890 | 7/1958 | Goroni | 43/44.99 |
| 2,844,907 | 7/1958 | Merton | 43/44.99 |
| 3,023,533 | 3/1962 | Bertram | 43/44.99 |
| 3,470,929 | 10/1969 | Thornton | 220/506 |
| 4,757,631 | 7/1988 | Anson-Smith | 43/17.5 |

Primary Examiner—Kurt Rowan
Assistant Examiner—James Miner
Attorney, Agent, or Firm—B. Craig Killough

[57] ABSTRACT

A chum buoy for dispensing chum into salt water fishing characterized by a flotation body, a compartment into which chum may be placed, and distributor through which chum is distributed from the compartment to salt water. The device may be weighted in a lower portion thereof to provide for proper orientation, or the device may be anchored. The chum buoy may have mirrored surfaces on a portion thereof to aid and attract fish.

3 Claims, 2 Drawing Sheets

CHUM BUOY

BACKGROUND OF THE INVENTION

This invention relates to a device which may be used for salt water fishing, and related activities, and is more specifically directed to a container which distributes an marine animal matter commonly and collectively known as "chum". "Chum" is a term used to define various marine animal parts which are placed into salt water for the purpose of attracting game fish, and most commonly sharks. Chum usually refers to fish which are cut or dissected into parts, and then distributed into the salt water.

In the prior art, the most common means of dispensing chum, other than placing the chum directly into the water, is to place the chum into a bag through which water can pass so as to distribute or dispense the chum into the water. This bag is then typically towed by a line behind the stern of a boat while trolling for game fish, thus creating a "chum slick" which attracts a variety of fish. Chum may be placed directly into the water, without dispensing means. Other types of containers having holes therein through which chum is released have been used by placing the containers into water.

Typically, bags do not allow for the chum to be most advantageously distributed into the water. Such bags do not always float well, and further, by being tied to a boat, may interfere with fishing, or with the operation of the boat, for example, by getting caught in a boat propeller. The two major (2) disadvantages of towing a conventional chum bag behind a boat while trolling are 1) the boat and motors' wake and cavitation can disrupt the chum slick as it is created; and 2) the chum slick may cause a "feeding frenzy" of sharks around the chum bag, which is located a short distance behind the boat, making it necessary to cut the chum bag line and retreat.

SUMMARY OF THE PRESENT INVENTION

The present invention provides a device which will distribute chum into the water, and is in the nature of a buoy so as to not necessitate being tied to a boat. The buoy is capable of flotation, and may be anchored to the bottom where water depths are not prohibitive, or in deep off-shore water, the buoy may be allowed to float freely. The chum buoy contains a compartment in which chum is contained, which also has voids therein of sufficient size to allow for proper dispensation of the chum. In the preferred embodiment, the device is generally spherical in shape so as to operate in a most advantageous manner when waves are present. The device will maintain its proper orientation when anchored, or may be weighted at the bottom of the sphere when floating freely to maintain its proper orientation. The present invention utilizes wave action to tip the device over, then is self-righting, thus facilitating the release of chum and the establishment of a chum slick. The chum buoy and the chum slick will not be disturbed by the boat's wake or the motor's cavitation. Also, the chum buoy when anchored, acts as a marker or point of reference for the fisherman as he trolls, marking the area where fish are believed to be.

DETAILED DESCRIPTION OF THE DRAWINGS

Figure 1:
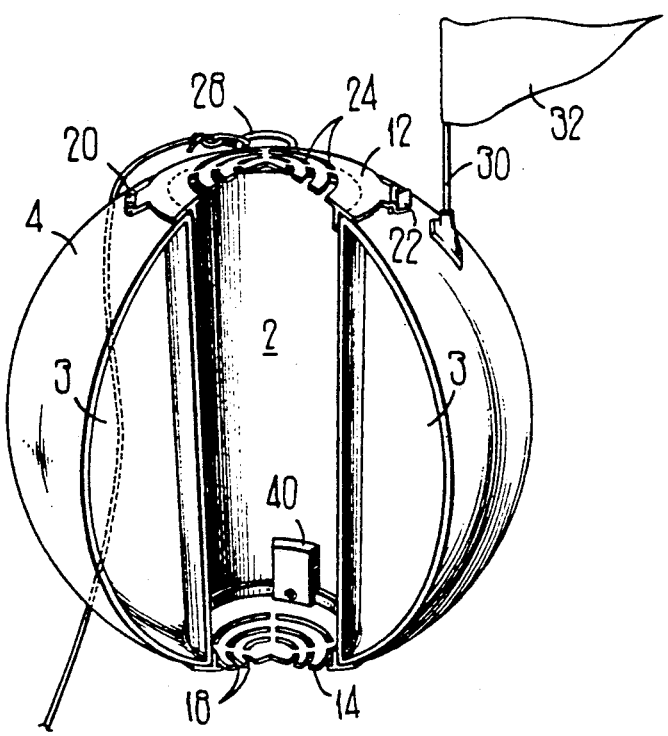

FIG. 1 depicts the device with a section thereof removed from the body 4 so as to show the flotation chamber 3 and the chum compartment 2.

Figure 2:
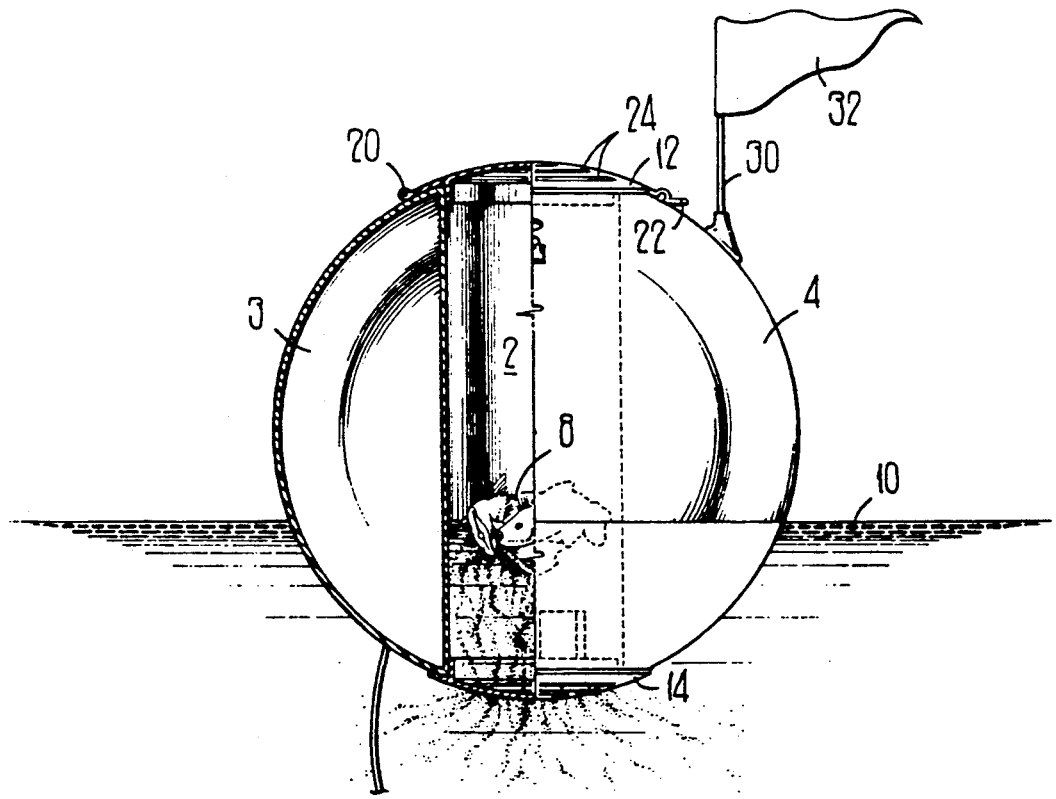

FIG. 2 is a side elevation with the body 4 being partially sectioned to show the flotation chamber 6 and the chum container 2, with chum present therein 8, and is shown as floating so as to distribute chum into the water 10 through the chum distributor 14.

Figure 3:
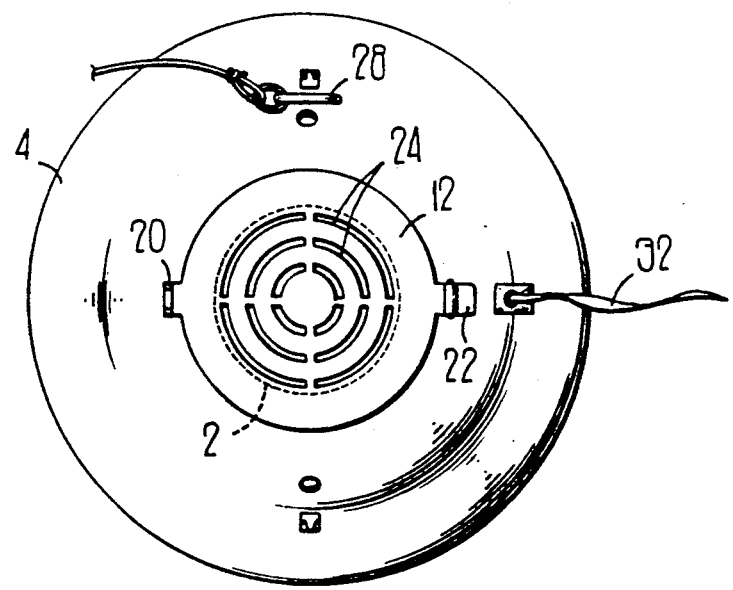

FIG. 3 is a top, plan view showing the door 12 to the chum compartment 2.

Figure 4:
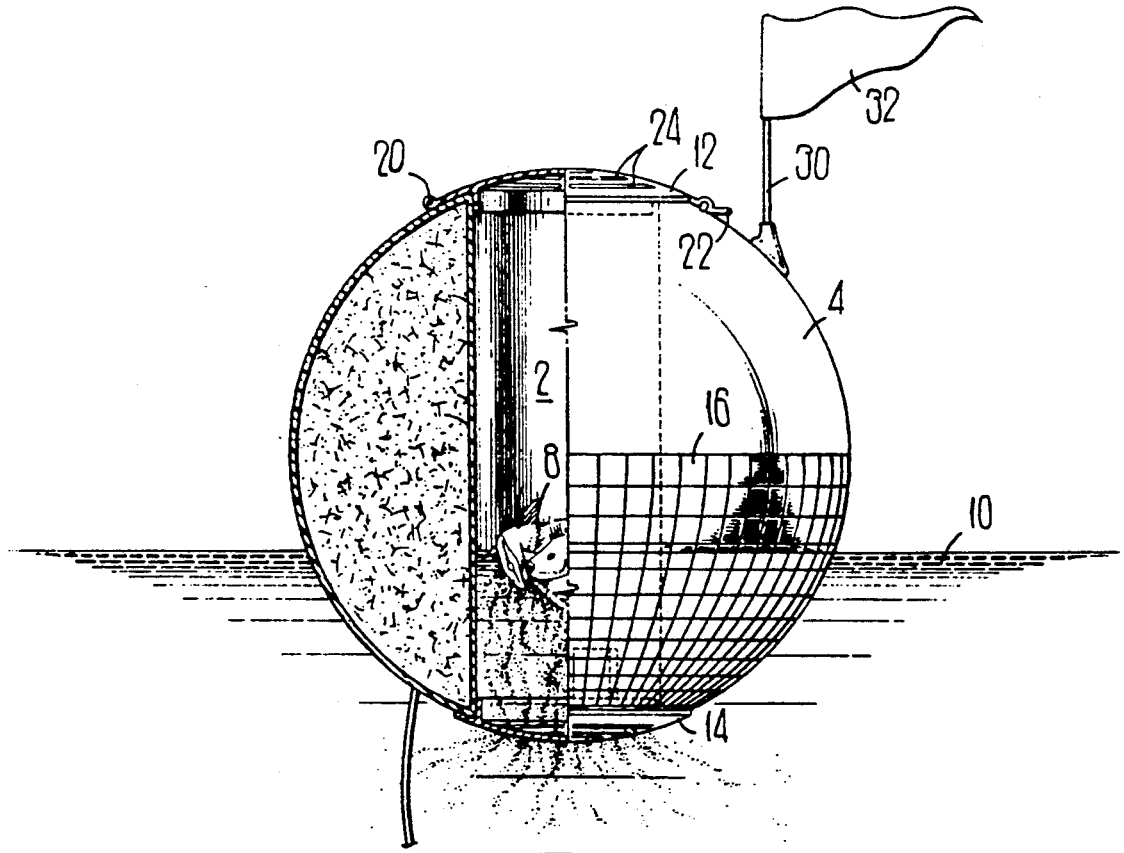

FIG. 4 corresponds to FIG. 2 and is an optional embodiment of the device showing mirrored surfaces 16 attached to the lower hemisphere of the device.

DETAILED DESCRIPTION OF THE PREFERRED EMBODIMENT

In the preferred embodiment, the chum buoy is generally spherical in shape, and is capable of flotation. The device may be any geometric shape into which is capable of flotation. A cylindrical void 2 runs through the spherical body 4 as is shown in the drawing figures. This cylindrical void 2 typically is oriented so that the length of the cylinder is perpendicular to the plane of the surface of the water, with access through the void 2 being provided at the top of the body 4. It is not necessary that the chum compartment so formed be cylindrical; it is only necessary that the chum compartment communicate with the water as will be seen, and that a means is provided for access to the chum compartment so that chum may be placed therein.

Access to the chum compartment is provided by means of a door 12. In the preferred embodiment, this door is hinged 20 on one side, and is provided with a latch 22 on the opposite side. Any similar access means could be used. As shown, voids 24 may be provided within the door so as to allow the level of contents of the compartment to be viewed from the top.

A chum distributor 14 is located on the lower surface of the body. This distributor 14 is submersed in water when the device is in use, and communicates with the water so as to allow chum to pass through this distributor 14 and to be disbursed or distributed into the water 10. The distributor has voids 18 therein through which the chum passes.

The area formed between the body 4 and the chum compartment 2 is water tight so that a flotation chamber 3 within the body of the sphere is formed. This flotation chamber may be of any shape, but must be water tight, and must be of sufficient size to allow the device to float when the chum compartment is filled to its proper level. Plastic materials are well suited for producing a water tight body which is capable of flotation, although most any material which will produce a floating body could be used. The flotation chamber(s) 3 may be hollow, or it could be filled with a low density material such as styrofoam 26. The presence of a foam material 26 aids in keeping the device from sinking in the event the body is punctured, by occupying space which would otherwise be filled with water.

In use, chum is placed into the chum compartment through the access door 12. The amount of chum to be used is dependent upon the length of time and the area in which the fishing activities are to take place. Once chum 8 is placed into the device, the device is placed into the water. If the water depth is not excessive, the device may be attached to an anchor line so as to be kept in place. An anchor tie 28 may be provided for attachment of the anchor line to the device. In deeper off-shore fishing applications, the device may be placed into the water and allowed to drift. An anchor line, with an anchor or other weight, may be attached to anchor tie 28, even when the device is drifting, to act in regulating the movement of the device as waves strike the device to distribute chum through the chum distributor 14. A mast 30 and flag or pennant 32 may be attached to the device so that the device may be sighted from a distance, or when waves intermittently obscure sighting of the device itself.

An additional embodiment of the device uses mirrored surfaces attached to the device. In the preferred embodiment, these mirrored surfaces 16 are attached to the lower hemisphere as shown in FIG. 4. The relatively large number of mirrored surfaces 16 reflect light in numerous varying directions, and aid in attracting fish. The body may be filled with foam.

The device is weighted in the lower hemisphere, or lower portion, of the body 4. Weighing material, such as lead weights 40, may be attached to the device, preferably near the chum distributor 14 while not interfering with the distribution of chum through the chum distributor. Weighing of the device in the lower hemisphere, or lower portion, of the body allows the device to remain properly oriented in the water, with the chum distributor submerged into the water. The weight should be of sufficient size to overcome wave action, while not so large as to increase the specific gravity of the overall device to prevent proper flotation.

What is claimed:

1. A chum buoy, comprising:
   (a) a body which is capable of flotation;
   (b) a compartment located within said body running longitudinally through said body, wherein said compartment has an opening on a top surface of said body into which chum may be placed, and which extends through to an opening where said compartment intersects a lower surface of said body so as to open below a water line, wherein said compartment is surrounded on all sides thereof by a flotation chamber of said body, excepting said opening on said top surface and said opening where said compartment intersects said lower surface which are not so surrounded; and,
   (c) a chum distributor plate located where said compartment intersects said body on said lower surface of said body below said water line, wherein said chum distributor has at least one open aperture which is of sufficient size to allow chum to be dispensed from said compartment through said aperture or apertures of said chum distributor.

2. A chum buoy, comprising:
   (a) a body which is capable of flotation, having a weighting material therein which is below a water line when said body is floating, to stabilize said body and influence proper orientation of said body;
   (b) a compartment located within said body running longitudinally through said body wherein said compartment has an opening on a top surface of said body which is above said water line into which chum may be placed, and which extends through to an opening where said compartment intersects at lower surface of said body so as to open below said water line, wherein said compartment is surrounded on all sides thereof by a flotation chamber of said body, excepting said opening on said top surface and said opening where said compartment intersects said lower surface, which are not so surrounded;
   (c) a chum distributor plate located where said compartment intersects said body on said lower surface of said body below said water line, wherein said chum distributor has at least one open aperture which is of sufficient size to allow chum to be dispensed from said compartment through said aperture or apertures of said chum distributor; and,
   (d) a counter balance which is attached to said body on an upper surface thereof which is above said water line, and which acts to counter the effect of waves upon said body and the weighted bottom thereof, so that as waves strike the buoy, the counter balance attached to the upper surface of said body acts with the weighted lower portion of said body to regulate the motion of the chum buoy to distribute chum through said chum distributor.

3. A chum buoy is described in claim 1, wherein said counter balance comprises a line attached to an upper portion of said body above said water line having an anchor or weight attached to end of said which is opposite an end of said line which is attached to said body.

* * * * *